United States Patent
Coronado et al.

(10) Patent No.: US 9,250,810 B2
(45) Date of Patent: Feb. 2, 2016

(54) PRIORITY BASED DEPOPULATION OF STORAGE RANKS

(75) Inventors: Juan A. Coronado, Tucson, AZ (US); Jennifer S. Shioya, Vail, AZ (US); Todd M. Tosseth, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 535 days.

(21) Appl. No.: 13/211,508

(22) Filed: Aug. 17, 2011

(65) Prior Publication Data

US 2013/0046950 A1    Feb. 21, 2013

(51) Int. Cl.
G06F 12/02    (2006.01)
G06F 12/00    (2006.01)
G06F 3/06    (2006.01)

(52) U.S. Cl.
CPC .............. *G06F 3/061* (2013.01); *G06F 3/0647* (2013.01); *G06F 3/0685* (2013.01)

(58) Field of Classification Search
CPC ......... G06F 12/00; G06F 12/08; G06F 12/12; G06F 17/30079; G06F 17/30083; G06F 17/30221
USPC .................................................. 711/103, 170
See application file for complete search history.

(56) References Cited

U.S. PATENT DOCUMENTS

| 6,000,020 | A | 12/1999 | Chin et al. | |
| 6,574,699 | B1 | 6/2003 | Dobbek | |
| 7,181,578 | B1 | 2/2007 | Guha et al. | |
| 2008/0104343 | A1* | 5/2008 | Miyagaki et al. | 711/158 |
| 2010/0005261 | A1 | 1/2010 | Shiga et al. | |
| 2011/0167217 | A1* | 7/2011 | Montgomery | 711/114 |

OTHER PUBLICATIONS

EMC, "Enginuity: The EM Symmetrix Storage Operating Environment," Oct. 2010, 28 pages.
Viviane Anavi-Chaput et al., "SAP on DB2 for z/OS an dOS/390: High Availability and Performance Monitoring with Data Sharing," Dec. 2003, 264 pages.
Hanyu Liu et al., "T-NDPack: timing-driven non-uniform depopulation based clustering," 2009, 6 pages.

* cited by examiner

*Primary Examiner* — Jared Rutz
*Assistant Examiner* — Christopher Do
(74) *Attorney, Agent, or Firm* — Griffiths & Seaton PLLC (57) ABSTRACT

Exemplary method, system, and computer program product embodiments for priority based depopulation of ranks in a computing storage environment are provided. In one embodiment, by way of example only, multiple ranks selected for depopulation are prioritized. The highest priority rank of the multiple ranks is depopulated to a target rank. Additional system and computer program product embodiments are disclosed and provide related advantages.

21 Claims, 11 Drawing Sheets

PRIORITY BASED DEPOPULATION OF STORAGE RANKS

BACKGROUND OF THE INVENTION

1. Field of the Invention

The present invention relates generally to computers, and more particularly, to priority based depopulation of storage ranks in a computing storage environment.

2. Description of the Related Art

In today's society, computer systems are commonplace. Computer systems may be found in the workplace, at home, or at school. The storage of electronic data is one of the most important aspects of the digital age as consumers and businesses increasingly rely on persistent, efficient and reliable access to this necessary data. Because of the importance of this data, a variety of methods and systems have been developed to provide redundant and efficient data access to ensure the availability of the data.

Computer systems may include data storage systems, or disk storage systems, to process and store data. Data storage systems, or disk storage systems, are utilized to process and store data. A storage system may include one or more disk drives and storage controllers that have several components within, such as arrays, ranks, device adapters, host adapters, and processor complexes, each with a specific set of capacities. These data processing systems typically require a large amount of data storage. Customer data, or data generated by users within the data processing system, occupies a great portion of this data storage.

SUMMARY OF THE DESCRIBED EMBODIMENTS

Within the storage system, the performance of rank depopulation operation entails the movement of all of a rank's allocated extents to one or more remaining ranks in the same storage pool. The benefit of rank depopulation is that it gives the customer the ability to move a rank from one pool to another without having to delete any data. Currently, multiple ranks may be depopulated out of a pool, but only at the same time. If the customer wants more than one rank to depopulate from a pool, the allocated extents end up being moved multiple times since the destination rank of the depopulation may very well be another rank to be depopulated later.

In the current state of the art, there is a way to prevent extents from being moved multiple times if multiple ranks want to be depopulated, but one in particular wants to be moved first. Essentially, the user would have to manually set the other, lower-priority ranks in a reserved state, and then commence the depopulation on the high-priority rank. But the customer would have to then monitor the progress of the depopulation, waiting for the first rank to complete, then manually reassign the rank to another pool and manually start the rest of the lower-priority ranks that had originally set to the reserved state. Since depopulation takes hours, if not days depending on the workload on the pool, having this be a manual process can be tedious and a waste of valuable time (especially if the high-priority rank is needed urgently in another pool) if the customer isn't able to check the depopulation of his high-priority rank regularly. As a result, efficiency and productivity may be reduced as well as in situations where a customer may ultimately desire to have multiple ranks depopulated out of a pool, but is motivated to move a specific rank first without depopulating the other multiple ranks at the same time, and doing so as soon as possible.

As a result, efficiency and productivity may be reduced as well as in situations where a customer may ultimately desire to have multiple ranks depopulated out of a pool, but is motivated to move a specific rank first without depopulating the other multiple ranks at the same time, and doing so as soon as possible.

Accordingly, and in view of the foregoing, various exemplary method, system, and computer program product embodiments for priority based depopulation of ranks in a computing storage environment are provided. In one embodiment, by way of example only, multiple ranks selected for depopulation are prioritized. The highest priority rank of the multiple ranks is depopulated to a target rank. Additional system and computer program product embodiments are disclosed and provide related advantages.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Within computing storage system is in the concept of a "storage pool". Storage pools may be groupings of volumes, and the volumes may be represented by a grouping of data that may be physical or logical. Each storage pool may be associated with a single directory of a single file system. A file system may be described as a system that manages Input/Output (I/O) operations to files and controls the format of information on storage devices. In particular, a file system allows applications to create and manage files on storage devices and to perform I/O operations to those files. A file system may also be described as a collection of files and certain attributes associated with those files.

A storage pool may be a logical collection of "ranks" A rank may be the basic unit of capacity in a storage system. Each rank may comprise one or more volumes for allocation. In some storage controllers of a storage system, such as IBM ESS Shark, a single pool comprises a single rank so the mapping is one-to-one. On the other hand, in other controllers, such as IBM DS8000 Megamouth, a single pool can comprise multiple ranks.

Storage controllers like IBM DS8K (DS8K) provides Easy Tier, which allows both manual and automatic movement of data between ranks and storage pools. The automatic mode of Easy Tier lets the customer allow the DS8K storage controller to determine which extents are "hot" (accessed most frequently) and move them to the highest performance tier of drives available in each pool, which improves performance. The manual Easy Tier controls allow customers to perform a variety of fine-tuning with movement of their data, including storage pool merges, volume migrations from one pool to another, and depopulating allocated extents of a rank from its pool.

As mentioned previously, rank depopulation entails the movement of all of a rank's allocated extents to one or more remaining ranks in the same storage pool. When a rank is depopulated, its extents are concurrently (without disrupting I/O) moved to other ranks with available extents in the same pool before the rank itself is taken out of the pool. The benefit of rank depopulation is that it provides the customer the ability to move a rank from one pool to another without having to delete any data. Reasons for depopulation include adding capacity to another pool, moving certain drive types to another pool, adding higher performance drives to another pool, and consolidate data in a pool, etc.

As previously mentioned, there is a way to prevent extents from being moved multiple times if multiple ranks want to be depopulated, but one in particular wants to be moved first. Essentially, the user would have to manually set the other, lower-priority ranks in a reserved state, and then commence the depopulation on the high-priority rank. But the customer would have to then monitor the progress of the depopulation, waiting for the first rank to complete, then manually reassign the rank to another pool and manually start the rest of the lower-priority ranks that had originally set to the reserved state. Since depopulation takes hours, if not days depending on the workload on the pool, having this be a manual process can be tedious and a waste of valuable time (especially if the high-priority rank is needed urgently in another pool) if the customer isn't able to check the depopulation of his high-priority rank regularly.

If the customer wants multiple ranks to depopulate from a storage pool (or "extent pool"), the allocated extents end up being moved multiple times, as the destination rank may very well be another rank to be depopulated later. As a result, efficiency and productivity may be reduced as well as in situations where a customer may ultimately desire to have multiple ranks depopulated out of a pool, but is motivated to move a specific rank first, and as soon as possible.

For example, consider the scenario where a customer has a DS8K with all enterprise drives except for one array of more expensive SSD drivers. The customer has been using storage pool [A] as the Easy Tier managed pool by making it a hybrid pool (e.g., a pool that contains at least two different drive types such as enterprise drives and solid state drivers (SSD)). The focus and priority of the customer now shifts to another pool [B], and the customer would now like to move the SSD rank from pool [A] to the new, higher-priority pool [B] in order to make it Easy Tier manageable. For purposes of this example, the storage pool [A] contains 4 ranks (3 are Enterprise ranks and 1 is an SSD rank). The customer wants to start using the SSD rank [X] in pool [B] as soon as possible to maximize performance. Also, the customer also wants to depopulate Enterprise rank [Y] out of pool [A], but this has a lower priority to SSD rank [X].

With the customer being so keen on transferring the SSD rank [X] from pool [A] into pool [B] as soon as possible, the fastest way is to depopulate only SSD rank [X]. Only when depopulation is complete can the user start the depopulation of Enterprise rank [Y], otherwise both ranks would be depopulated at the same time (as mentioned above), thus slowing down the depopulation of SSD rank [X]. However, when the SSD rank [X]'s depopulation is complete, the SSD extents may now be spread across all three remaining Enterprise ranks in pool [A], even though one of those ranks is going to be depopulated next. Thus, when the customer starts the depopulation of lower-priority Enterprise rank [Y], some extents that had just been moved off the SSD rank onto Enterprise rank [Y] will need to be moved again. This is not a very efficient use of time or resources.

In the current state of the art, the user can only manually reserve the ranks that are planned to be depopulated at a later time, and then, commence the depopulating on the highest-priority rank. When the highest-priority rank completes depopulation, the user may manually start the depopulation of the next highest-priority rank, and so on. However, the drawback to this is that the customer must manually monitor the status of each depopulation operation and intervene when it's time to start the next rank depopulation. This can lead to wasted time if the customer cannot wait around to monitor the status of the machine, as rank depopulations can take many hours to complete.

In order to address the inefficiencies and performance issues previously described, the illustrated embodiments provide mechanisms for a priority based depopulation of ranks. In one embodiment, by way of example only, multiple ranks selected for depopulation are prioritized. The highest priority rank of the multiple ranks is depopulated to a target rank. Moreover, the mechanisms of the present invention allow the user to list and prioritize the rank depopulations, automatically re-assign a rank immediately after its depopulation is complete, and allow for automating the process of monitoring and invoking the subsequent depopulations without human interaction.

Figure 1:
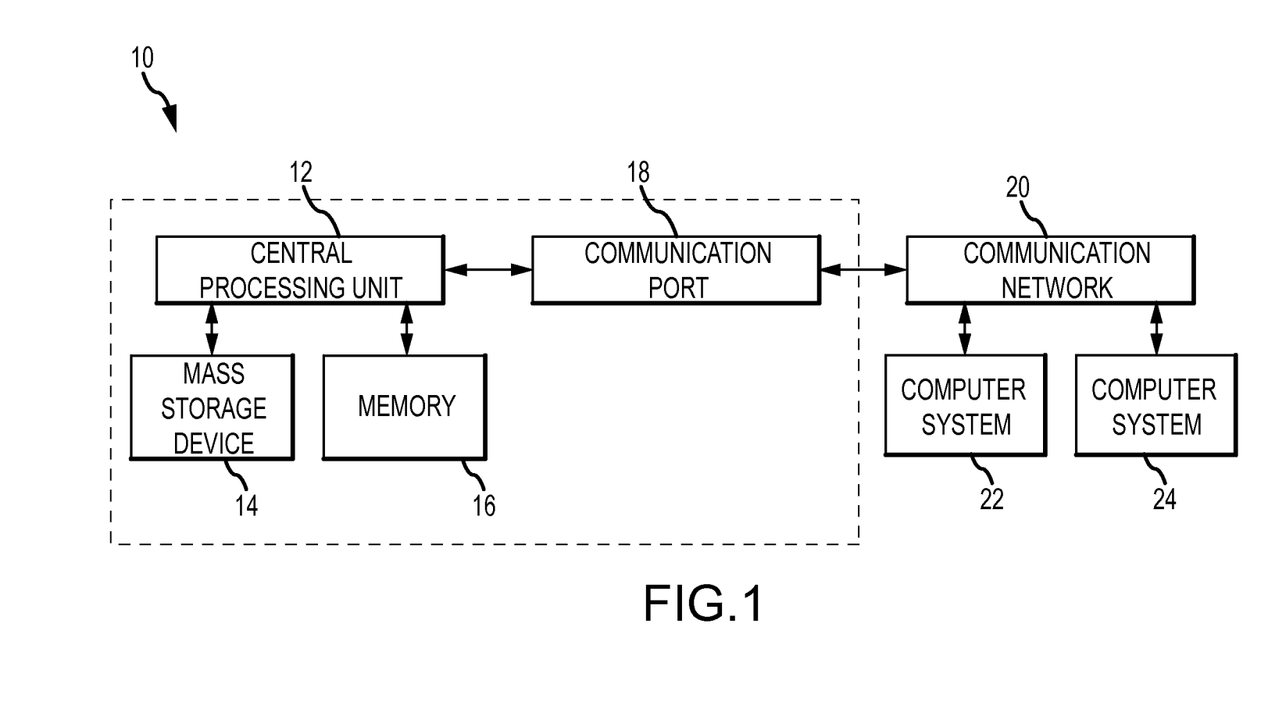
FIG. 1 illustrates a computer storage environment having an exemplary storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s)

14 and memory device 16. Mass storage devices may include hard disk drive (HDD) devices, which may be configured in a redundant array of independent disks (RAID). The operations of the illustrated embodiments may be executed on device(s) 14, located in system 10 or elsewhere. Memory device 16 may include such memory as electrically erasable programmable read only memory (EEPROMs) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. Moreover, the computer systems 10, 22, and 24 may have multiple memory devices 16 and CPU's 12 for executing the functionality each individual component.

Figure 2A:
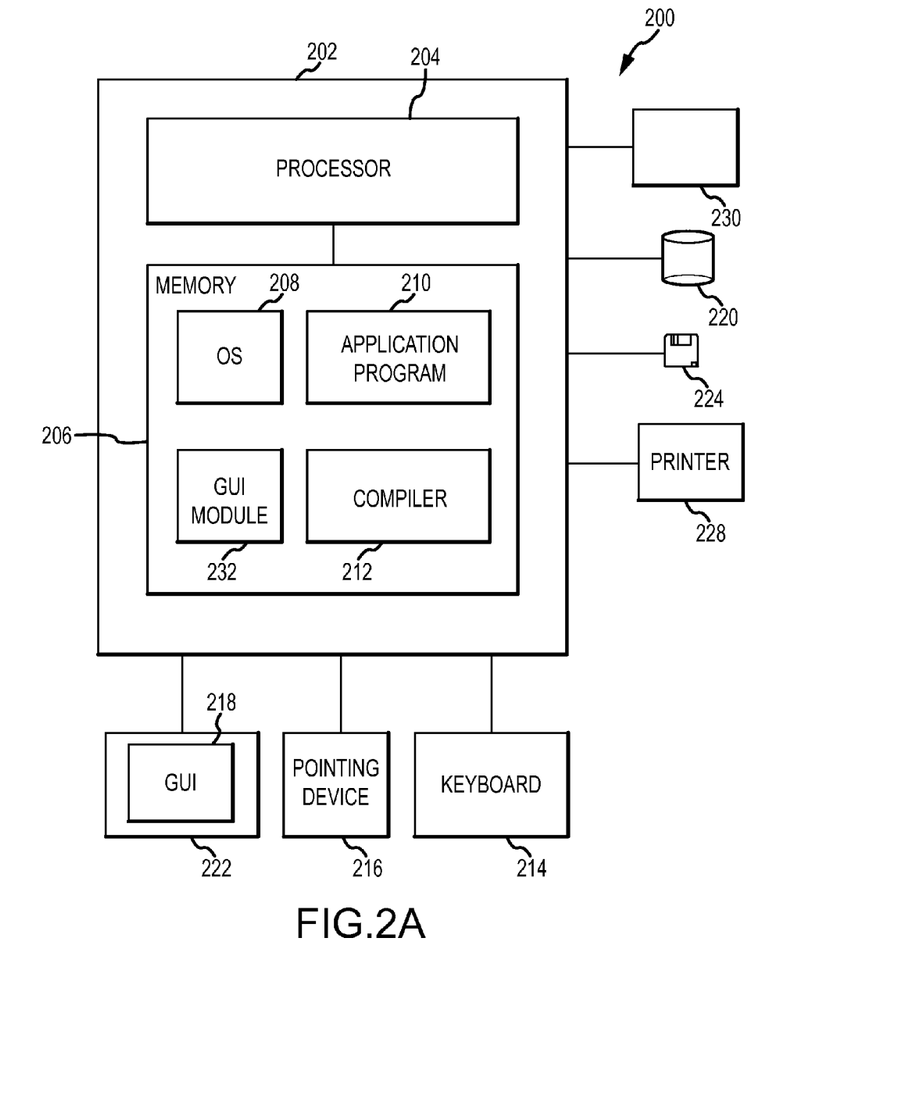
FIG. 2A illustrates an exemplary computer system that can be used to implement embodiments of the present invention.

FIG. 2A illustrates an exemplary computer system that can be used to implement embodiments of the present invention. FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202. Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212, which allows one or more application programs 210 written in a programming language such as COBOL PL1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230.

Embodiments of the present invention are generally directed to a software application program 210 that manages data objects (i.e., files) access to a storage system comprised of multiple separate storage devices. The program 210 may operate within a single computer 202 or as part of a distributed computer system comprising a network of computing and storage devices. The network may encompass one or more computer/storage devices connected via a local area network and/or Internet connection (which may be public or secure, e.g. through a VPN connection).

Figure 2B:
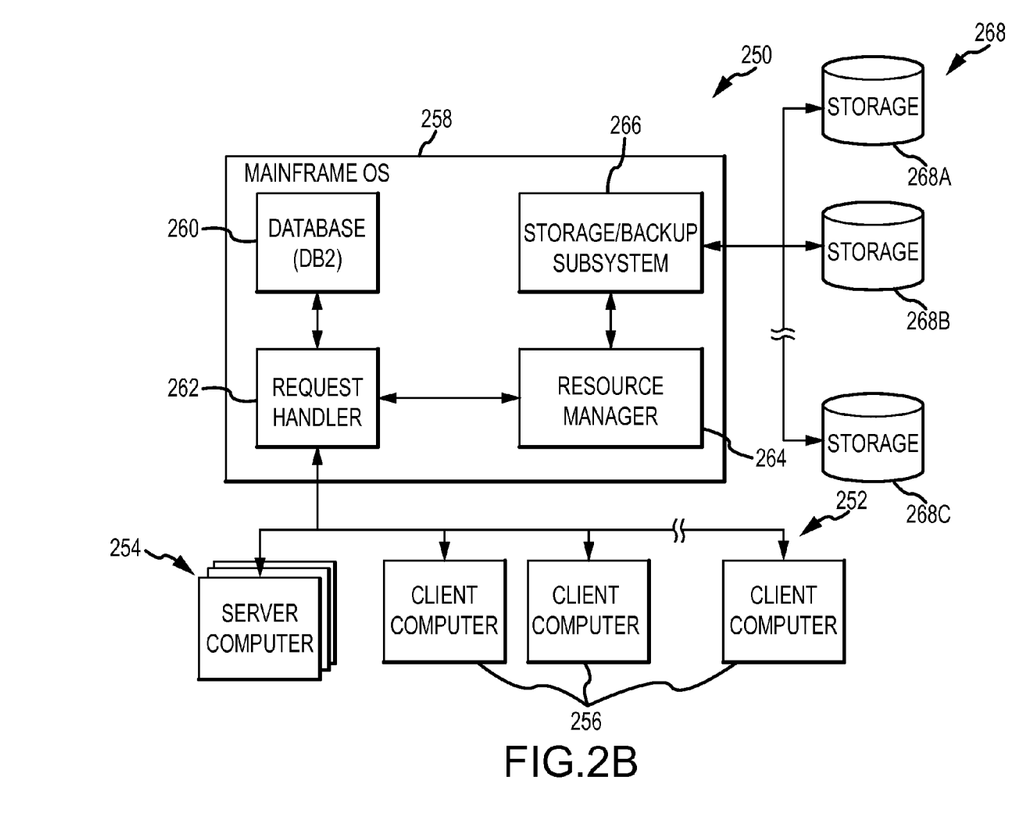
FIG. 2B illustrates a typical distributed computer system in which aspects of the present invention may be realized.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264, which directs data accesses through storage/backup subsystem 266 that facilitates accesses to networked storage devices 268 comprising a SAN. Thus, the storage/backup subsystem 266 on the computer 258 comprises the backup server, which manages backup data objects from the client computers 256 stored on networked storage devices 268 in a distributed storage system. The SAN may include devices such as direct access storage devices (DASD) optical storage and/or tape storage indicated as distinct physical storage devices 268 A-268 C. Various known access methods (e.g. VSAM, BSAM, QSAM) may function as part of the storage/backup subsystem 266.

Figure 2C:
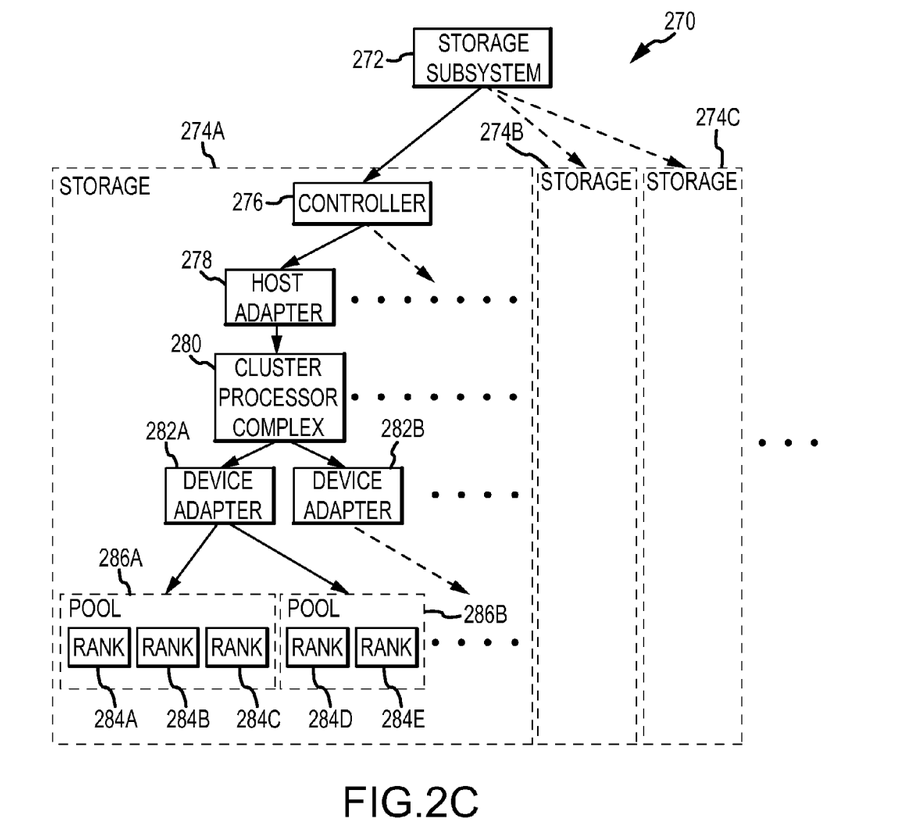
FIG. 2C illustrates a typical storage system implementing an embodiment of the invention.

FIG. 2C illustrates a typical storage system 270 implementing an embodiment of the invention. For example, the storage system 270 may operate as part of the storage/backup subsystem 266 and storage devices 268 in the distributed computer system 250 of FIG. 2B. A typical implementation of the invention comprises a program operating on the storage subsystem 272 (e.g., the storage/backup subsystem 266 of the computer 258 of FIG. 2B). The storage subsystem 272 is coupled to a plurality of storage devices 274 A-274 C. Although only one storage device 247 A will be described in detail, it should be understood that other storage devices 274 B, 274 C may be similarly constituted. The controller 276 directs where data goes within the storage device 274 A. The data is at least part of a storage workload coming through the storage subsystem 272. Typically, one or more host adapters 278 operate as the external interface to the system coupled to the cluster processor complex 280, which handles inputs and outputs coming from the one or more host adapters 278. The cluster processor complex 280 is connected to device adapters 282 A and 282 B, which connect the ranks 284 A-E to the system that controls them. The ranks 284A-284 E comprise the physical disks where the data is physically stored in the storage device 274A and which are accessed through one or more device adapters 282A, 282B coupled to the cluster processor complex 280. The ranks 284A-284E may be organized into one or more pools 286A, 286B under a given device adapter 282A. Within the ranks, are extents, which are contiguous regions of computer storage mediums reserved for a file(s). The described hardware architecture is only an example; those skilled in the art will understand that any number of different devices (e.g., controllers, host adapters, cluster processors, device adapters and physical disks comprising data volumes) may be coupled together in alternate architectures within the scope of the invention.

Figure 3:
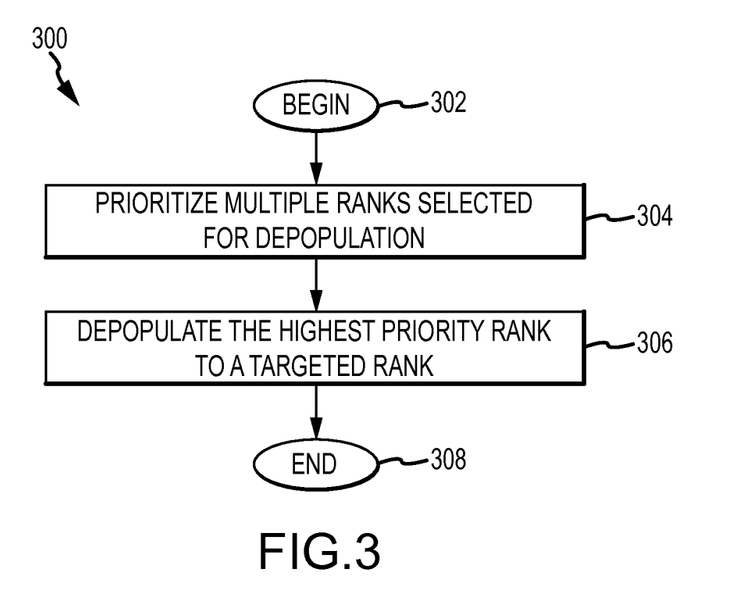
FIG. 3 is a flowchart illustrating an exemplary method for depopulation of ranks in which aspects of the present invention may be realized.

FIG. 3 is a flowchart illustrating an exemplary method 300 for depopulation of ranks in which aspects of the present invention may be realized. The method 300 begins (step 302) by prioritizing multiple ranks selected for depopulation (step 304). The prioritized ranks may be included in a list and the list used accordingly to perform the operations of the illustrated embodiments. The highest priority rank from the prioritized ranks is depopulated to a targeted rank (step 306). The targeted ranks exclude all lower priority ranks from being depopulated into the targeted ranks. The method 300 ends (step 308).

In one embodiment, the mechanisms of the present invention are directed to a priority-based depopulation of multiple ranks from a storage pool, including a way to prioritize the order in which the ranks are depopulated and to specify if a specific rank should be automatically assigned to a new pool after its depopulation is complete. In one embodiment, by way of example only, if no priority is given, all the ranks may be depopulated at the same time. If the highest priority rank is designated to be reassigned to an alternative storage pool upon completion of the depopulation, the highest priority rank will be reassigned to the alternative storage pool, otherwise the highest priority rank will be unassigned from all pools upon completion of depopulation, if not selected for reassignment.

Figure 4:
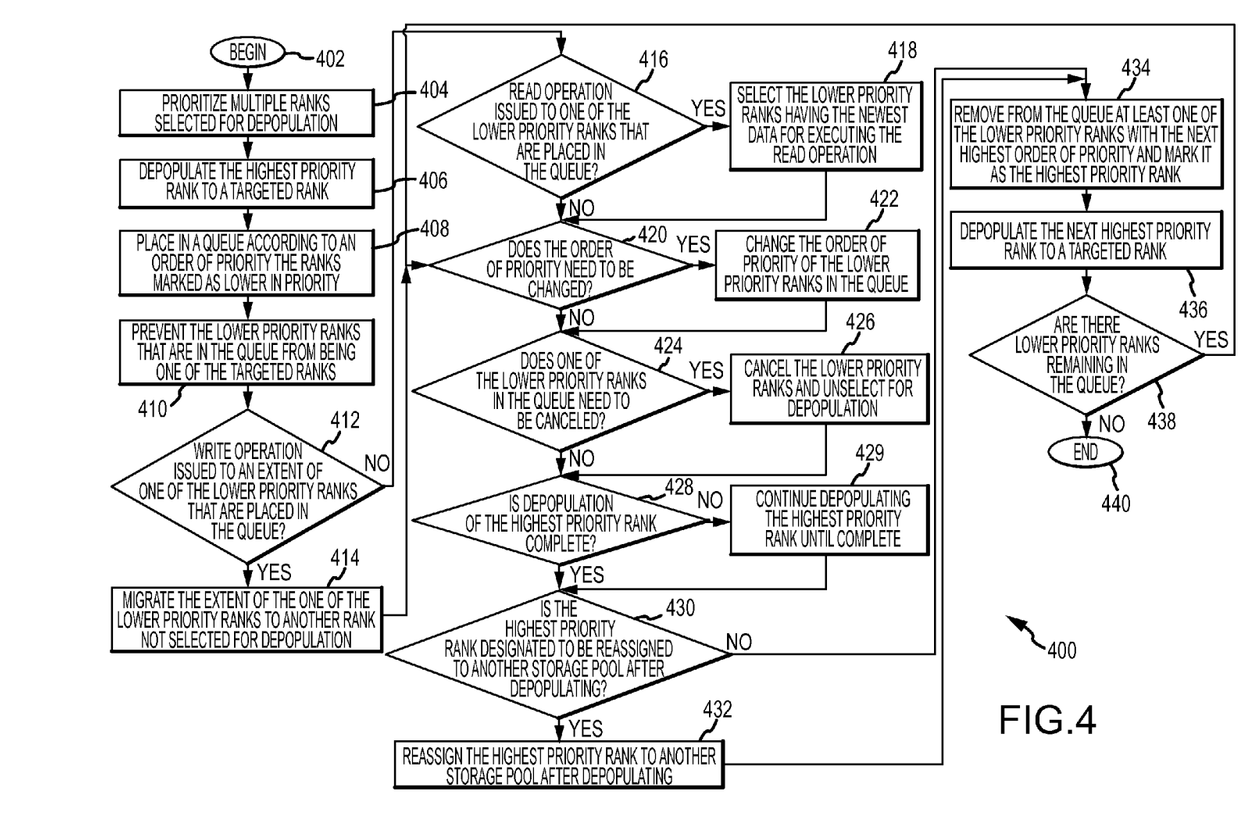
FIG. 4 is a flowchart illustrating an exemplary method for depopulation of ranks with lower priority ranks placed in a queue in which aspects of the present invention may be realized.

Turning to FIG. 4, FIG. 4 is a flowchart illustrating an exemplary method 400 for displaying and arranging maximum values associated with time intervals for comparison against current values in which aspects of the present invention may be realized in one embodiment. The method 400 begins (step 402) by prioritizing multiple ranks selected for depopulation (step 404). The method 400 will depopulate the highest priority rank to a targeted rank (step 406). The ranks marked lower in priority are placed in a queue according to an order of priority (step 408). The method 400 prevents the lower priority ranks that are in the queue from being one of the targeted ranks (step 410). In other words, all lower priority ranks are excluded from being depopulated into the targeted ranks. In one embodiment, after the highest priority rank is depopulated, the newly depopulated rank will be unassigned from the pool in which it was assigned. The next highest prioritized rank is depopulated in a sequential manner until all of the lower prioritized ranks are depopulated. The method 400 will determine if a write operation is issued to an extent of one of the lower priority ranks that are placed in the queue (step 412). If yes, the method 400 may migrate the extent of the one of the lower priority ranks to another rank not selected for depopulation (step 414). If no, the method 400 determines if a read operation is issued to one of the lower priority ranks that are placed in the queue (step 416). If yes, the method 400 may select the lower priority ranks having the newest data for executing the read operation (step 418). The method 400 determines if the order of priority of the lower prioritized ranks in the queue need to be changed (step 420). If yes, the method 400 may change the order of priority of the lower priority ranks in the queue (step 422). The reasons for the change may be based upon a variety of reasons such as performance issues and/or users preferences. If no, the method 400 will determine if one of the lower priority ranks in the queue needs to be canceled (step 424). If yes, the method 400 may cancel the lower priority ranks and unselect for depopulation (step 426). The method 400 will determine if the depopulation of the highest priority rank is complete (step 428). If no, the method 400 will continue depopulating the highest priority rank until complete (step 429). If the depopulation of the highest prioritized ranks is complete, the method 400 may determine if the highest priority rank is designated to be reassigned to another storage pool after depopulating (step 430). If yes, the highest priority rank is reassigned to another storage pool after depopulating (step 432). If no, the method 400 may remove from the queue at least one of the lower priority ranks with the next highest order of priority and mark it as the highest priority rank (step 434). The next highest priority rank is then depopulated to a targeted rank (step 436). The method 400 will determine if there are any lower priority ranks remaining in the queue (step 438). If yes, go to step 420 and continue the steps of method 400. If no, the method ends (step 440).

In an alternative embodiment, by way of example only, the mechanisms of the present invention allow multiple ranks to be depopulated from a pool in a specific order by prioritizing the depopulation of higher priority ranks. In one embodiment, the mechanisms mark the highest priority rank as the DEPOPULATING rank. Those of lower priority ranks, selected for depopulation, are marked as DEPOP_QUEUED and placed in order of priority in a priority array. When a rank is marked as DEPOP_QUEUED, the mechanisms ensure that extents from the current depopulation of the highest priority rank will not be moved to the ranks marked as DEPOP_QUEUED to avoid moving extents inefficiently. Any write input/output (I/O) to an extent in a rank in the DEPOP_QUEUED state will trigger the migration of that extent to the other ranks in the pool, thereby decreasing the amount of times the extent moves, once the rank in the DEPOP_QUEUED state gets time to migrate its extents to the other ranks in the pool. When a read of data occurs, and one or more extents of the data read are in the DEPOP_QUEUED rank, the mechanisms will determine from which rank to read the latest data.

Moreover the mechanisms initiate the depopulation of the DEPOPULATING rank (e.g., the highest priority rank). When the depopulation of the highest priority rank is complete, the rank will become unassigned. However, the mechanisms may determine from customer input if the rank should now be assigned to another pool, and if so, the highest priority rank is reassigned to the specified pool. The mechanisms may then take the next highest priority rank out of the priority array (e.g., those in a queue) and mark the next highest priority rank as the DEPOPULATING rank. The mechanisms then continue the processes previously described until there are no DEPOP_QUEUED ranks remaining in the priority array.

In addition, the mechanisms still provide the flexibility of changing the state or priority of the rank(s) being depopulated after the initial request to depopulate a list of ranks is submitted. The mechanism may change a rank in DEPOP_QUEUED state to NORMAL state if it is desired to cancel the depopulation of the queued rank. The mechanism may also change the priority of the ranks being depopulated.

Figure 5:
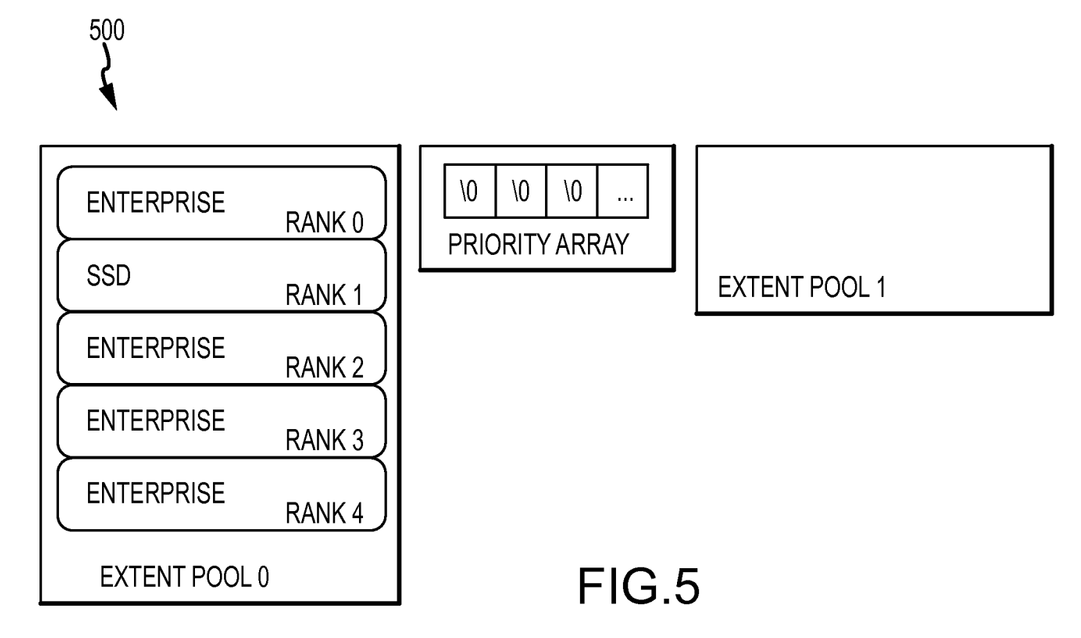
FIG. 5 illustrates an exemplary block diagram showing 2 extent pools and 5 ranks.

To illustrate the embodiments previously described, FIGS. 5-9 illustrate a sample scenario of the mechanisms for priority-based depopulation. The example provided includes 2 extent pools with 5 ranks and is just a sample scenario that is not to be considered limiting in scope. FIG. 5 illustrates an exemplary block diagram 500 showing 2 extent pools and 5 ranks. In Extent Pool 0, FIG. 5 depicts Extent Pool 0 containing 5 ranks: Rank 0, Rank 1, Rank 2, Rank 3, and Rank 4 and Extent Pool 1 containing no ranks. All the ranks in Extent Pool 0 are Enterprise ranks except for Rank 1, which has SSD drives. In the current example, it is desired by the customer to depopulate ranks in the following order: Rank 1, then Rank 2, then Rank 0. A Priority Array is depicted but at this point there are no lower priority ranks placed in the Priority Array (e.g., no lower priority ranks are queued). The customer would also like to specify that Rank 1 be reassigned to Extent Pool 1 as soon as its depopulation is complete, so that mechanisms can start utilizing the SSD drives as soon as possible.

Figure 6:
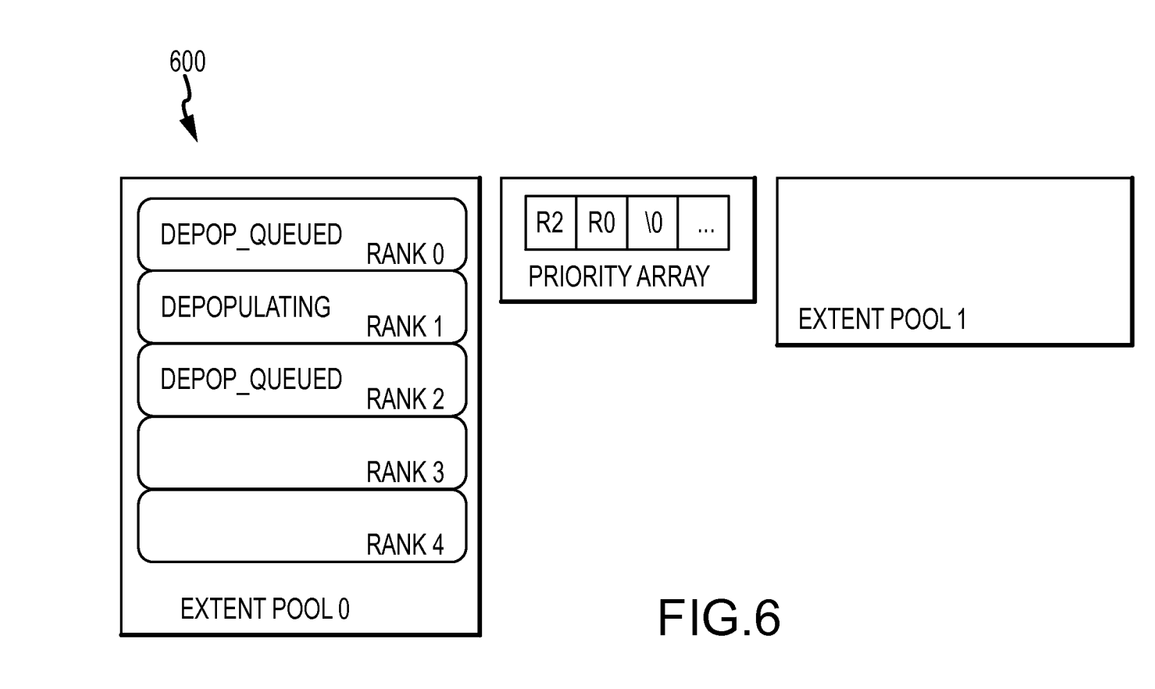
FIG. 6 illustrates an exemplary block diagram showing depopulation of rank 1and placing lower priority ranks in queue.

FIG. 6 illustrates an exemplary block diagram showing depopulation of rank 1 and placing lower priority ranks in queue. FIG. 6 depicts that Rank 1 is marked as DEPOPULATING, since it has the highest priority, and thereby is considered the highest priority rank, and then Ranks 2 and 0 will be placed in the priority array (e.g., placed in queue) in order of priority. At this point, the Extent Pool 1 is still empty. Rank 0 and Rank 2 are marked as DEPOP_QUEUED and thus cannot be considered as a targeted rank for depopulating the highest priority rank, which excludes all lower priority ranks from being depopulated into the targeted ranks. In other words, only Rank 3 and/or Rank 4 may only be considered targeted ranks for depopulating Rank 1 (e.g., the highest priority rank)

Figure 7:
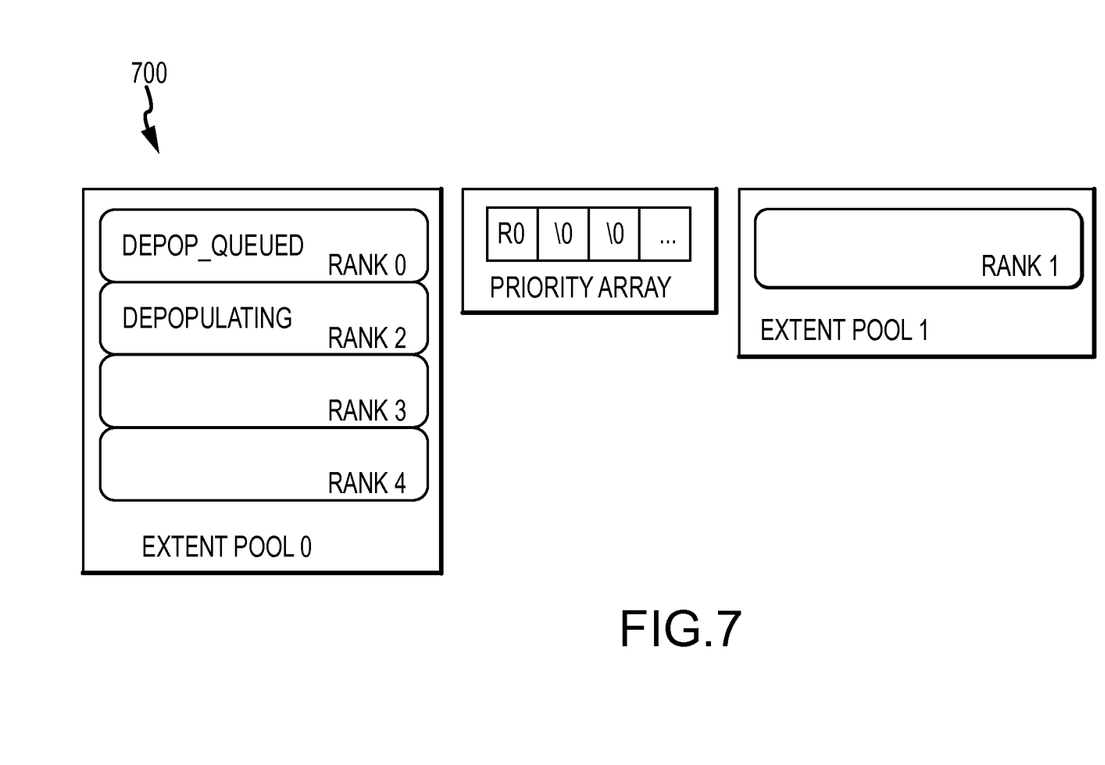
FIG. 7 illustrates an exemplary block diagram showing rank 1 reassigned to extent pool 1 and rank 2 taken out of queue and selected for depopulation.

Turning now to FIG. 7, FIG. 7 illustrates an exemplary block diagram showing rank 1 reassigned to extent pool 1 and rank 2 taken out of queue (e.g., removed from the priority array) and selected for depopulation by marking it as DEPOPULATING. When Rank 1 finishes depopulating, it will be assigned to Extent Pool 1 as requested by the customer as depicted in FIG. 5-6. At this point, Extent Pool 1 contains an SSD rank (Rank 1) and is ready for use. Meanwhile, the next highest priority rank (Rank 2) is taken out of the priority array and is marked as DEPOPULATING. Rank 2 now becomes the highest priority rank for depopulation.

Figure 8:
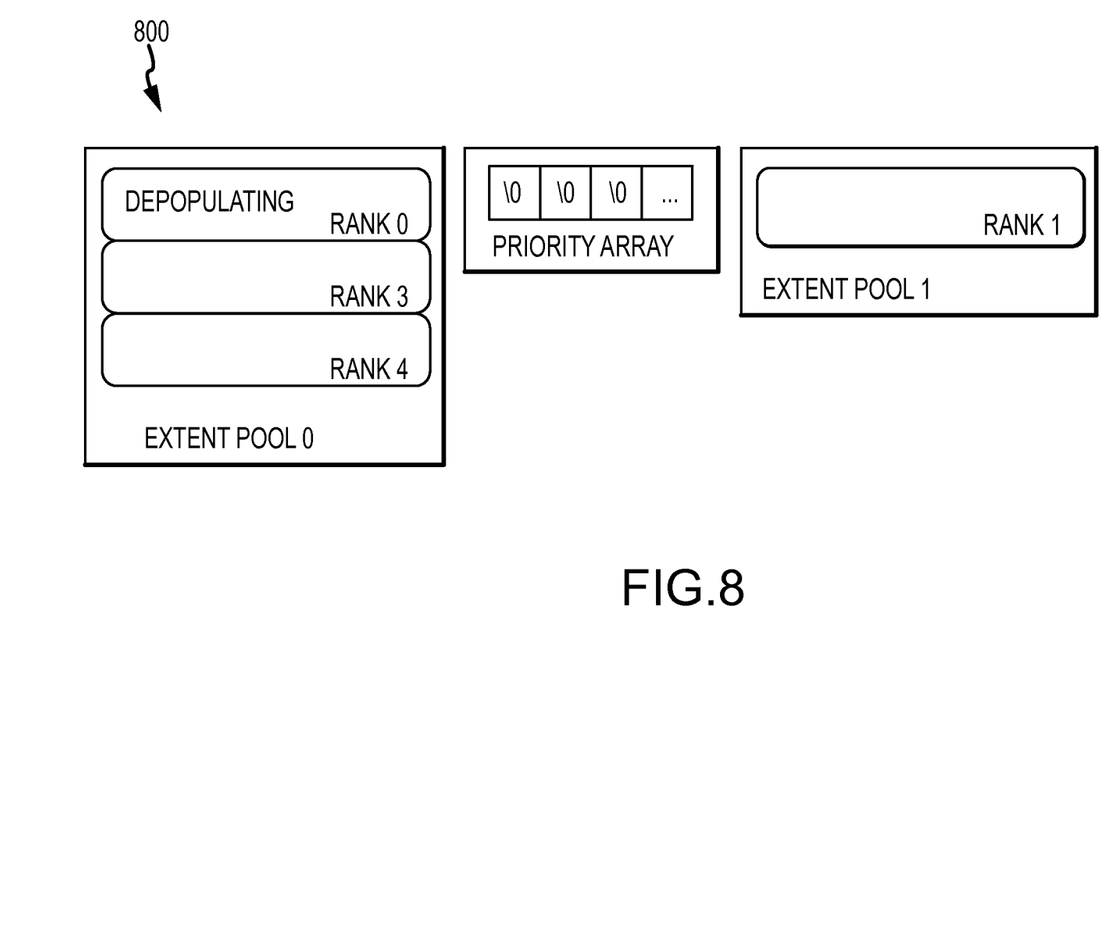
FIG. 8 illustrates an exemplary block diagram showing rank 0 taken out of queue and selected for depopulation.

FIG. 8 illustrates an exemplary block diagram showing rank 0 taken out of queue and selected for depopulation. When Rank 2 finishes depopulating, it will remain unassigned because the customer did not request that it be assigned to another pool. Rank 0 is taken out of the priority array and is marked as DEPOPULATING.

Figure 9:
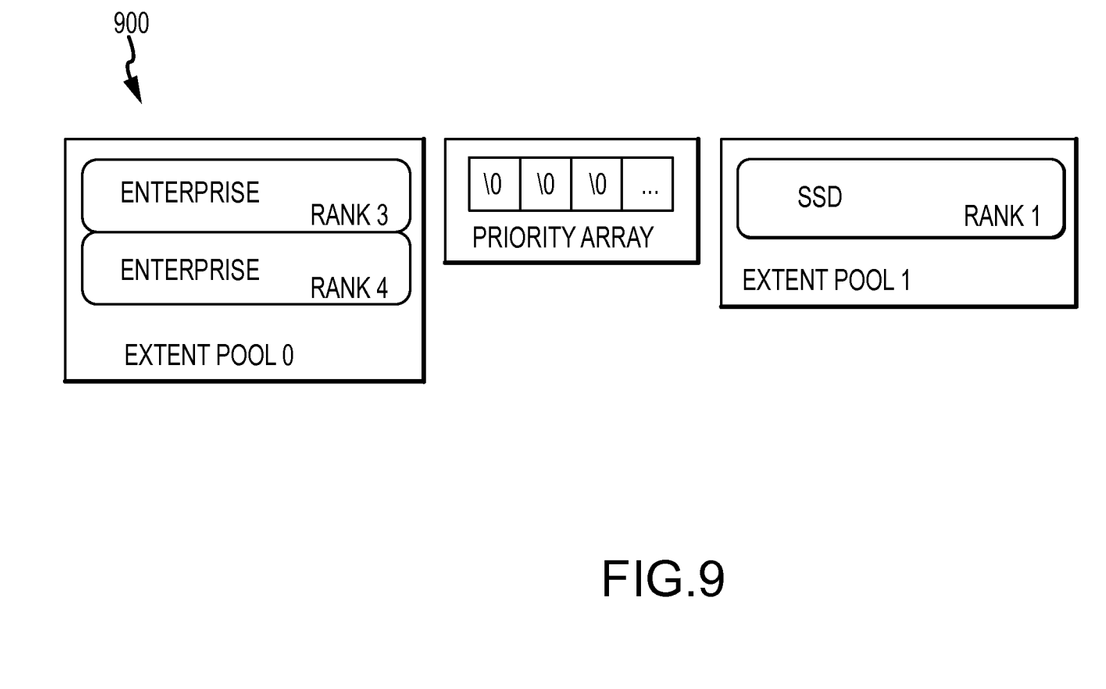
FIG. 9 illustrates an exemplary block diagram showing a completion of depopulation of all prioritized ranks.

FIG. 9 illustrates an exemplary block diagram showing a completion of depopulation of all prioritized ranks. When Rank 0 finishes depopulation, it, too, will remain unassigned because the customer did not request that it be assigned to another pool. There are no more ranks in the priority array, so all the rank depopulations are now complete.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for priority based depopulation of ranks in a computing storage environment by a processor device, comprising:
    prioritizing a plurality of ranks selected for depopulation;
    marking at least one of the plurality of ranks as highest priority ranks and selecting the highest priority ranks for the depopulation;
    marking at least one of the plurality of ranks as lower priority ranks and selecting the lower priority ranks for the depopulation;
    placing in a queue according to an order of priority those of the plurality of ranks marked as the lower priority ranks, wherein the queue is a priority array;
    migrating an extent of the one of the lower priority ranks to another one of the plurality of ranks not selected for depopulation in response to a write operation to an extent of one of lower priority ranks that are placed in a queue;
    selecting the one of the lower priority ranks with newer data for executing the read operation in response to a read operation to one of the lower priority ranks that are placed in the queue;
    depopulating at least one of the plurality of ranks marked as a highest priority rank to at least one of a plurality of targeted ranks;
    leaving the highest priority rank as unassigned to one of the plurality of targeted ranks following the depopulating until determining if the highest priority rank is to be assigned the one of the plurality of targeted ranks;
    determining if the highest priority rank is designated to be reassigned to another one of the plurality of targeted ranks after performing the depopulation; and
    depopulating a next highest priority rank in a sequential manner until each of the lower priority ranks are depopulated.

2. The method of claim 1, wherein the lower priority ranks are prevented from being one of the at least one of the plurality of targeted ranks by being placed in the queue.

3. The method of claim 1, further including changing an order of priority for lower priority ranks in a queue according to user preferences.

4. The method of claim 1, further including performing each one of:
    marking, as the highest priority rank, one of the lower priority ranks in the queue that is now a next highest priority rank in the queue,
    determining if an order of priority of the lower priority ranks needs to be altered, and
    removing the one of the lower priority ranks in the queue that is now marked as the highest priority rank in the queue.

5. The method of claim 1, further including, upon completion of the depopulating, automatically removing from a queue at least one of lower priority ranks with a next highest order of priority and marking the at least one of the lower priority ranks as the highest priority rank.

6. The method of claim 1, further including, performing at least one of:
    canceling at least one of a lower priority ranks selected for depopulation in a queue, wherein the at least one of the lower priority ranks is unselected for depopulation, and
    reordering the at least one of the lower priority ranks that are in the queue while depopulating the highest priority rank.

7. The method of claim 1, further including, if the highest priority rank is designated to be reassigned, reassigning the highest priority rank to an alternative storage pool upon the completion of the depopulating.

8. A system for priority based depopulation of ranks in a computing environment, comprising:
    a processor device operable in the computing storage environment, wherein processor device is adapted for:
        prioritizing a plurality of ranks selected for depopulation,
        marking at least one of the plurality of ranks as highest priority ranks and selecting the highest priority ranks for the depopulation,
        marking at least one of the plurality of ranks as lower priority ranks and selecting the lower priority ranks for the depopulation,
        placing in a queue according to an order of priority those of the plurality of ranks marked as the lower priority ranks, wherein the queue is a priority array,
        migrating an extent of the one of the lower priority ranks to another one of the plurality of ranks not selected for depopulation in response to a write operation to an extent of one of lower priority ranks that are placed in a queue,
        selecting the one of the lower priority ranks with newer data for executing the read operation in response to a read operation to one of the lower priority ranks that are placed in the queue,
        depopulating at least one of the plurality of ranks marked as a highest priority rank to at least one of a plurality of targeted ranks,
        leaving the highest priority rank as unassigned to one of the plurality of targeted ranks following the depopulating until determining if the highest priority rank is to be assigned the one of the plurality of targeted ranks,
        determining if the highest priority rank is designated to be reassigned to another one of the plurality of targeted ranks after performing the depopulation, and
        depopulating a next highest priority rank in a sequential manner until each of the lower priority ranks are depopulated.

9. The system of claim 8, wherein the lower priority ranks are prevented from being one of the at least one of the plurality of targeted ranks by being placed in the queue.

10. The system of claim 8, wherein the processor device is further adapted for changing an order of priority for lower priority ranks in a queue according to user preferences.

11. The system of claim 8, wherein the processor device is further adapted for performing each one of:
- marking, as the highest priority rank, one of the lower priority ranks in the queue that is now a next highest priority rank in the queue,
- determining if an order of priority of the lower priority ranks needs to be altered, and
- removing the one of the lower priority ranks in the queue that is now marked as the highest priority rank in the queue.

12. The system of claim 8, wherein the processor device is further adapted for, upon completion of the depopulating, automatically removing from a queue at least one of lower priority ranks with a next highest order of priority and marking the at least one of the lower priority ranks as the highest priority rank.

13. The system of claim 8, wherein the processor device is further adapted for, performing at least one of:
- canceling at least one of a lower priority ranks selected for depopulation in a queue, wherein the at least one of the lower priority ranks is unselected for depopulation, and
- reordering the at least one of the lower priority ranks that are in the queue while depopulating the highest priority rank.

14. The system of claim 8, wherein the processor device is further adapted for, if the highest priority rank is designated to be reassigned, reassigning the highest priority rank to an alternative storage pool upon the completion of the depopulating.

15. A computer program product for priority based depopulation of ranks in a computing storage environment by a processor device, the computer program product comprising a non-transitory computer-readable storage medium having computer-readable program code portions stored therein, the computer-readable program code portions comprising:
- a first executable portion for prioritizing a plurality of ranks selected for depopulation;
- a second executable portion for marking at least one of the plurality of ranks as highest priority ranks and selecting the highest priority ranks for the depopulation;
- a third executable portion for marking at least one of the plurality of ranks as lower priority ranks and selecting the lower priority ranks for the depopulation;
- a fourth executable portion for placing in a queue according to an order of priority those of the plurality of ranks marked as the lower priority ranks, wherein the queue is a priority array;
- a fifth executable portion for migrating an extent of the one of the lower priority ranks to another one of the plurality of ranks not selected for depopulation in response to a write operation to an extent of one of lower priority ranks that are placed in a queue;
- selecting the one of the lower priority ranks with newer data for executing the read operation in response to a read operation to one of the lower priority ranks that are placed in the queue;
- a sixth executable portion for depopulating at least one of the plurality of ranks marked as a highest priority rank to at least one of a plurality of targeted ranks;
- a seventh executable portion leaving the highest priority rank as unassigned to one of the plurality of targeted ranks following the depopulating until determining if the highest priority rank is to be assigned the one of the plurality of targeted ranks;
- an eighth executable portion determining if the highest priority rank is designated to be reassigned to another one of the plurality of targeted ranks after performing the depopulation; and
- a ninth executable portion depopulating a next highest priority rank in a sequential manner until each of the lower priority ranks are depopulated.

16. The computer program product of claim 15, wherein the lower priority ranks are prevented from being one of the at least one of the plurality of targeted ranks by being placed in the queue.

17. The computer program product of claim 15, further including a tenth executable portion for changing an order of priority for lower priority ranks in a queue according to user preferences.

18. The computer program product of claim 15, further including a tenth executable portion for, performing each one of:
- marking, as the highest priority rank, one of the lower priority ranks in the queue that is now a next highest priority rank in the queue,
- determining if an order of priority of the lower priority ranks needs to be altered, and
- removing the one of the lower priority ranks in the queue that is now marked as the highest priority rank in the queue.

19. The computer program product of claim 15, further including a tenth executable portion for, upon completion of the depopulating, automatically removing from a queue at least one of lower priority ranks with a next highest order of priority and marking the at least one of the lower priority ranks as the highest priority rank.

20. The computer program product of claim 15, further including a tenth executable portion for performing at least one of:
- canceling at least one of a lower priority ranks selected for depopulation in a queue, wherein the at least one of the lower priority ranks is unselected for depopulation, and
- reordering the at least one of the lower priority ranks that are in the queue while depopulating the highest priority rank.

21. The computer program product of claim 15, further including a tenth executable portion for, if the highest priority rank is designated to be reassigned, reassigning the highest priority rank to an alternative storage pool upon the completion of the depopulating.

* * * * *